(12) United States Patent
Bruder

(10) Patent No.: US 7,216,753 B2
(45) Date of Patent: May 15, 2007

(54) VEHICLE DRIVE APPARATUS

(75) Inventor: David E. Bruder, Novi, MI (US)

(73) Assignee: BorgWarner Inc., Auburn Hills, MI (US)

( * ) Notice: Subject to any disclaimer, the term of this patent is extended or adjusted under 35 U.S.C. 154(b) by 92 days.

(21) Appl. No.: 10/963,379

(22) Filed: Oct. 12, 2004

(65) Prior Publication Data

US 2005/0126875 A1 Jun. 16, 2005

Related U.S. Application Data

(60) Provisional application No. 60/529,956, filed on Dec. 16, 2003.

(51) Int. Cl.
*B60K 23/08* (2006.01)
*B60W 10/02* (2006.01)
*B60W 10/18* (2006.01)

(52) U.S. Cl. ..................... 192/218; 192/221; 192/13 R

(58) Field of Classification Search ...................... None
See application file for complete search history.

(56) References Cited

U.S. PATENT DOCUMENTS

| 6,005,358 | A | * | 12/1999 | Radev | 318/139 |
| 6,208,929 | B1 | * | 3/2001 | Matsuno et al. | 701/89 |
| 2005/0116537 | A1 | * | 6/2005 | Zalewski et al. | 303/139 |
| 2005/0187059 | A1 | * | 8/2005 | Kroppe | 475/116 |
| 2005/0272550 | A1 | * | 12/2005 | Kroppe | 475/116 |

FOREIGN PATENT DOCUMENTS

CA 2492481 A1 * 10/2003

* cited by examiner

*Primary Examiner*—Richard M. Lorence
(74) *Attorney, Agent, or Firm*—Reising, Ethington, Barnes, Kisselle P.C.

(57) ABSTRACT

A vehicle drive apparatus (10) for dividing torque between primary and secondary drive axles (16, 18) of a motor vehicle and including a hydraulically actuated clutch pack (26) that transfers torque to a secondary drive axle (18) of an automotive vehicle. A hydraulic channel (30) extends and provides hydraulic fluid communication between a hydraulic pressure source (22) and the clutch pack (26). The source of hydraulic system power is shared with a hydraulically-actuated wheel braking system (14).

10 Claims, 5 Drawing Sheets

VEHICLE DRIVE APPARATUS

CROSS-REFERENCES TO RELATED APPLICATIONS

This application claims priority from Provisional Application No. 60/529,956, filed Dec. 16, 2003 and entitled "All-Wheel-Drive Coupling Apparatus".

STATEMENT REGARDING FEDERALLY SPONSORED RESEARCH OR DEVELOPMENT

Not Applicable

BACKGROUND OF THE INVENTION

1. Field of the Invention

This invention relates generally to an all-wheel-drive coupling for dividing torque between primary and secondary drive axles of a motor vehicle.

2. Description of the Related Art Including Information Disclosed Under 37 CFR 1.97 and 1.98

It is known for vehicle drive systems to include a vehicle drive apparatus that divides torque between primary and secondary drive axles of a motor vehicle. Generally, such a coupling apparatus will include a transfer case that houses a hydraulically actuated clutch pack for transferring a desired amount of torque to a secondary drive axle of an automotive vehicle. A hydraulic oil pump provides hydraulic pressure to actuate the clutch pack.

In designing an all-wheel-drive apparatus for passenger vehicles and trucks it's beneficial to reduce the cost of the apparatus until the cost is low enough compared to the cost of two-wheel-drive architectures, that the all-wheel-drive apparatus is able to achieve an acceptable degree of market penetration. One of the ways to reduce the cost of an all-wheel-drive apparatus is through systems integration, i.e., by integrating functions that the all-wheel-drive apparatus has in common with other systems in an automotive vehicle. If functions that an all-wheel-drive apparatus has in common with other systems can be integrated in such a way as to support those functions with common hardware instead of duplicate, independent hardware, a lower system cost can be achieved.

For example, the drive system in at least one year model of the Audi A8 includes a vehicle drive apparatus having a hydraulically actuated all-wheel-drive clutch pack that uses an automatic transmission as a source of hydraulic pressure. The automatic transmission has a hydraulic pump for actuating its own hydro-mechanical components, and this source of hydraulic pressure is tapped for use in actuating the all-wheel-drive clutch pack. A hydraulic line extends and provides hydraulic fluid communication between the all-wheel-drive clutch pack and the hydraulic pump of the automatic transmission.

However, there are compatibility problems associated with the use of an automatic transmission hydraulic pump as a pressure source for an all-wheel-drive clutch pack. These compatibility problems must be overcome before the hydraulic pump of an automatic transmission can be used to actuate an all-wheel-drive clutch pack. For example, all-wheel-drive clutch packs typically require a greater magnitude of hydraulic pressure to operate properly. While hydraulic power supplies for actuating all-wheel-drive clutch packs generally output hydraulic pressure in the range of 1000–2000 psi, hydraulic power supplies for automatic transmissions only provide about 50–200 psi of hydraulic pressure.

What is needed is an automotive drive system that integrates a vehicle drive apparatus into a vehicle drive system by allowing the vehicle drive apparatus to share a compatible hydraulic power supply with another drive system component. What is also needed is such a vehicle drive apparatus that is adapted to use such an existing hydraulic power supply to actuate the clutch pack of the apparatus.

BRIEF SUMMARY OF THE INVENTION

The invention is a vehicle drive apparatus that divides torque between primary and secondary drive axles of a motor vehicle using a vehicle braking system as a hydraulic pressure source. The apparatus includes a hydraulically actuated clutch pack configured to transfer torque to a secondary drive axle of an automotive vehicle and a source of hydraulic pressure. The vehicle drive apparatus also includes a hydraulic channel extending and providing hydraulic fluid communication between the source of hydraulic pressure and the clutch pack. The source of hydraulic pressure is shared with a hydraulically-actuated wheel braking system. Therefore, a vehicle drive apparatus constructed according to the invention requires no dedicated source of hydraulic pressure and can, instead, use a vehicle brake system as a source of hydraulic pressure for actuating components of the all-wheel-drive clutch pack. Reduced system cost is achieved by eliminating the need for a separate actuator power supply for the all-wheel-drive system.

The invention takes advantage of the fact that certain braking systems such as anti-lock braking systems, traction control systems, stability control systems, and electro-hydraulic "brake-by-wire" braking systems include dedicated hydraulic power sources that provide a "self-apply" capability apart from the hydraulic power provided by manual brake pedal depression. In these braking systems hydraulic power is used to actuate a piston having similar size and force requirements as in all-wheel drive systems, and therefore requires the same approximate magnitude of hydraulic pressure to operate.

The invention also takes advantage of the fact that anti-lock braking systems, traction control systems, stability control systems, and electro-hydraulic "brake-by-wire" braking systems include brake system controllers that require some or all of the same inputs, i.e., steering angle, yaw rate, lateral acceleration, and wheel speed inputs, that an all-wheel-drive system uses.

According to another aspect of the invention, the clutch pack is configured to connect to and be electronically controlled by an all-wheel-drive controller, a transmission controller, or a brake system controller that may be a traction control system controller, a stability control system controller, or an electro-hydraulic braking system controller.

According to another aspect of the invention, the clutch pack is configured to transfer torque from an engine transmission to a secondary drive axle in an automotive all-wheel drive system.

According to another aspect of the invention, the clutch pack is configured to connect to and receive hydraulic pressure from a brake system hydraulic pump that may be an anti-lock braking system pump, a traction control system pump, or an electro-hydraulic braking system pump.

According to another aspect of the invention a vehicle drive apparatus is provided that includes an all-wheel-drive coupling and a wheel brake system. The all-wheel-drive coupling includes a hydraulically actuated clutch pack configured to transfer torque to a secondary drive axle of an automotive vehicle. The wheel brake system includes a brake system hydraulic pump and a brake system controller. The brake system hydraulic pump is in fluid communication with the all-wheel-drive clutch pack and provides hydraulic power to the clutch pack.

According to another aspect of the invention, the brake system hydraulic pump is included in a brake system modulator that is configured to control hydraulic actuation of the all-wheel-drive clutch pack. The brake system modulator may include connections that provide fluid communication with wheel brakes of the vehicle and an additional connection that provides fluid communication with the all-wheel-drive clutch pack. The brake system modulator may also include a brake controller connected to the hydraulic pump and programmed to control hydraulic actuation of the all-wheel-drive clutch pack in response to such inputs as steering angle, yaw rate, lateral acceleration, and wheel speed inputs from vehicle sensors.

According to another aspect of the invention, the apparatus includes a dedicated hydraulic system that is separate from the hydraulic system of a wheel brake system that powers the vehicle drive apparatus. The dedicated hydraulic system includes an all-wheel-drive hydraulic pump designed to be mounted in a position to be driven by a pump motor of a brake system hydraulic pump so that a hydraulic failure in the all-wheel-drive system will not affect operation of the brake system.

According to another aspect of the invention, the all-wheel-drive hydraulic pump includes a plunger supported for reciprocal motion in a pump casing such that reciprocal plunger motion draws hydraulic fluid into a pump inlet of the pump casing and pushes hydraulic fluid out a pump outlet of the pump casing and the plunger is drivable through at least a portion of its reciprocal motion by an eccentric cam carried by a pump motor shaft of a brake system hydraulic pump.

According to another aspect of the invention, the all-wheel-drive hydraulic system includes a hydraulic fluid reservoir in fluid communication with an inlet of the all-wheel-drive hydraulic pump through a first hydraulic fluid path. The hydraulic fluid reservoir is carried as a separate compartment of a brake system master cylinder reservoir allowing both the brake hydraulic system and the all-wheel-drive hydraulic system to be evacuated and filled at vehicle assembly at the same assembly line station.

According to another aspect of the invention, a priming valve is connected in the first hydraulic fluid path between the fluid reservoir and the all-wheel-drive hydraulic pump inlet and is operable to control the supply of hydraulic fluid to the all-wheel-drive hydraulic pump.

According to another aspect of the invention, the priming valve is normally closed so that, should control of the priming valve be lost, only the all-wheel-drive hydraulic system would be disabled and the pump motor would continue operating the brake system pump so that the brake system would continue to be operable. If the priming valve were configured to be normally open, the all-wheel-drive pump would operate and pressurize the all-wheel-drive hydraulic system whenever the pump motor would be turning.

According to another aspect of the invention, the apparatus includes a priming valve solenoid operably connected to the priming valve and configured to drive the priming valve between open and closed positions, the priming valve solenoid is coupled to a controller, and the controller is configured to control the supply of hydraulic fluid to the all-wheel-drive pump by controlling the position of the priming valve through electronic control of the priming valve solenoid.

According to another aspect of the invention, a dump valve is connected in a second hydraulic fluid path between the all-wheel-drive clutch pack and the reservoir and is operable to control the return of hydraulic fluid from the clutch pack to the reservoir.

According to another aspect of the invention, the apparatus includes a dump valve solenoid operably connected to the dump valve and configured to drive the dump valve between open and closed positions, the dump valve solenoid is coupled to a controller, and the controller is configured to control the return of hydraulic fluid from the clutch pack to the reservoir by controlling the position of the dump valve through electronic control of the dump valve solenoid.

According to another aspect of the invention, the dump valve is normally open so that the all-wheel-drive hydraulic system will not be pressurized if control over the operation of the dump valve is lost.

According to another aspect of the invention, the apparatus includes a flow restricting orifice connected in a second hydraulic path between the clutch pack and the dump valve to provide fine pressure control. Fine control resolution requires small volumetric flow (since volumetric flow is related to pressure by the stiffness of a passage). As such, orifice size determines pressure resolution (minimum commandable pressure step size) by setting, for a given pressure, the volume of fluid that can return to the reservoir in a single pulse for a given minimum dump valve pulse value (the minimum electrical pulse length required to open the dump valve). In other words, the orifice allows smaller pressure steps given a fixed minimum dump valve opening time, i.e., improved control resolution.

According to another aspect of the invention, the apparatus includes an orifice bypass valve connected in parallel with the orifice between the clutch pack and the dump valve and operable in response to control inputs to provide high volumetric flow allowing rapid pressure release. The bypass valve allows for rapid changes in volumetric flow to provide both fine control through the orifice, alone, when pressure is being modulated in the all-wheel-drive hydraulic system to control the clutch pack and quick release of hydraulic pressure through both the orifice and the bypass valve when torque needs to be released quickly.

According to another aspect of the invention, the controller is configured to modulate pressure applied to the clutch pack during application of torque by coordinating pump motor speed and the position of the dump valve.

According to another aspect of the invention, the controller is configured to modulate hydraulic pressure applied to the clutch pack during the release of torque by operating the dump valve.

According to another aspect of the invention, the controller is configured to modulate hydraulic pressure applied to the clutch pack during the release of torque by operating the dump valve and the orifice bypass valve.

According to another aspect of the invention, the apparatus includes a modular architecture in which one or more components selected from the group consisting of the priming valve, the dump valve, the orifice, the orifice bypass valve and the pressure sensor are included in a separate all-wheel-drive control assembly for applications where the ability of a brake system to accommodate these functions is limited or in applications where it is not desirable for the brake systems of all vehicles produced on a given vehicle platform to incorporate all these functions.

According to another aspect of the invention, the apparatus includes an integrated architecture in which one or more components from the group consisting of the priming valve, the dump valve, the orifice, the orifice bypass valve, and the sensor are included in the brake system hydraulic modulator to reduce cost in applications where, for example, all the vehicles constructed on a given vehicle platform will use a brake system modulator that includes these items.

BRIEF DESCRIPTION OF THE SEVERAL VIEWS OF THE DRAWINGS

These and other features and advantages of the invention will become apparent to those skilled in the art in connection with the following detailed description and drawings, in which.

DETAILED DESCRIPTION OF INVENTION EMBODIMENT(S)

Figure 1:
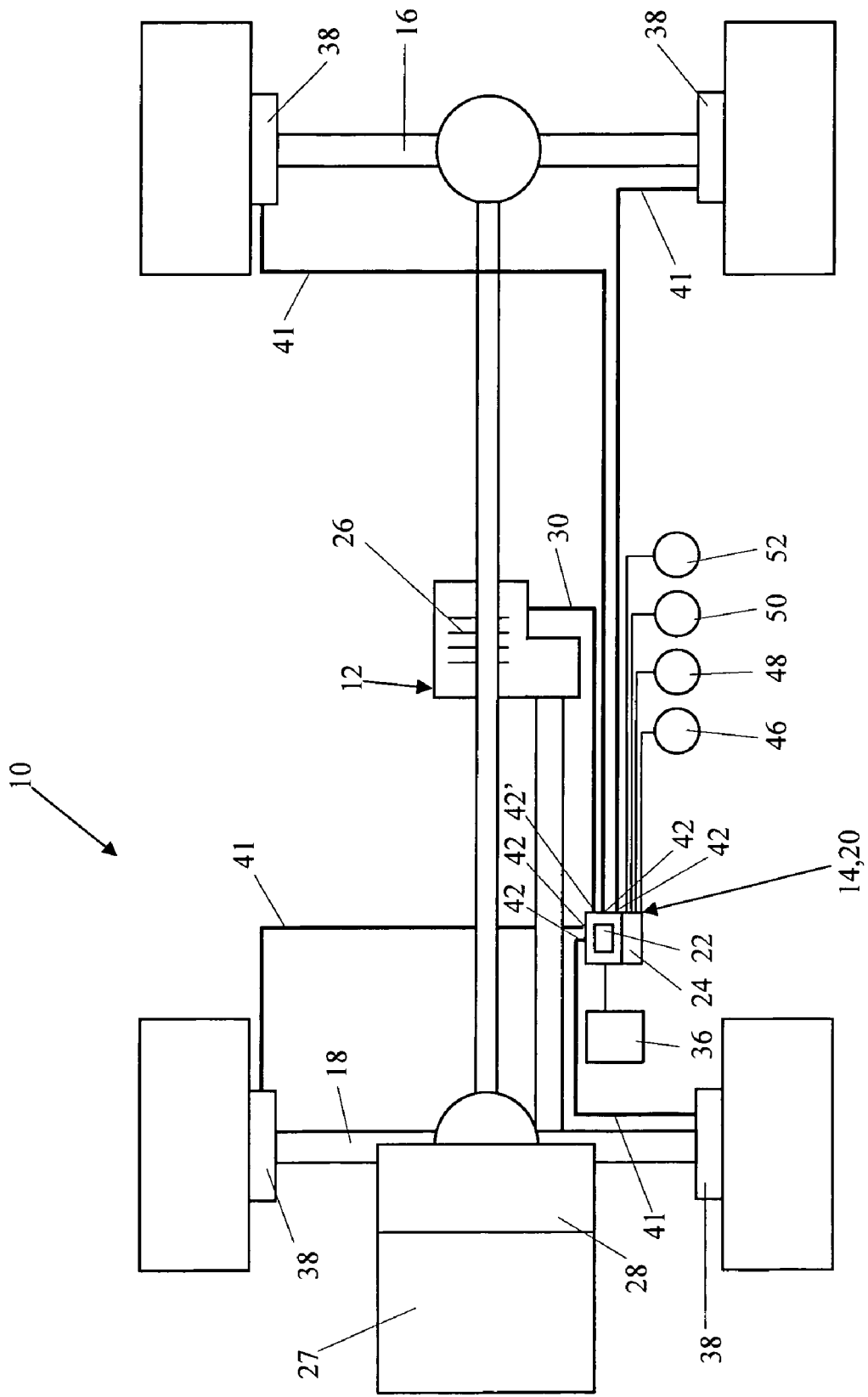
FIG. 1 is a schematic plan view of a first embodiment of an all wheel drive coupling apparatus constructed according to the invention and installed in an automobile drive system.
Figure 2:
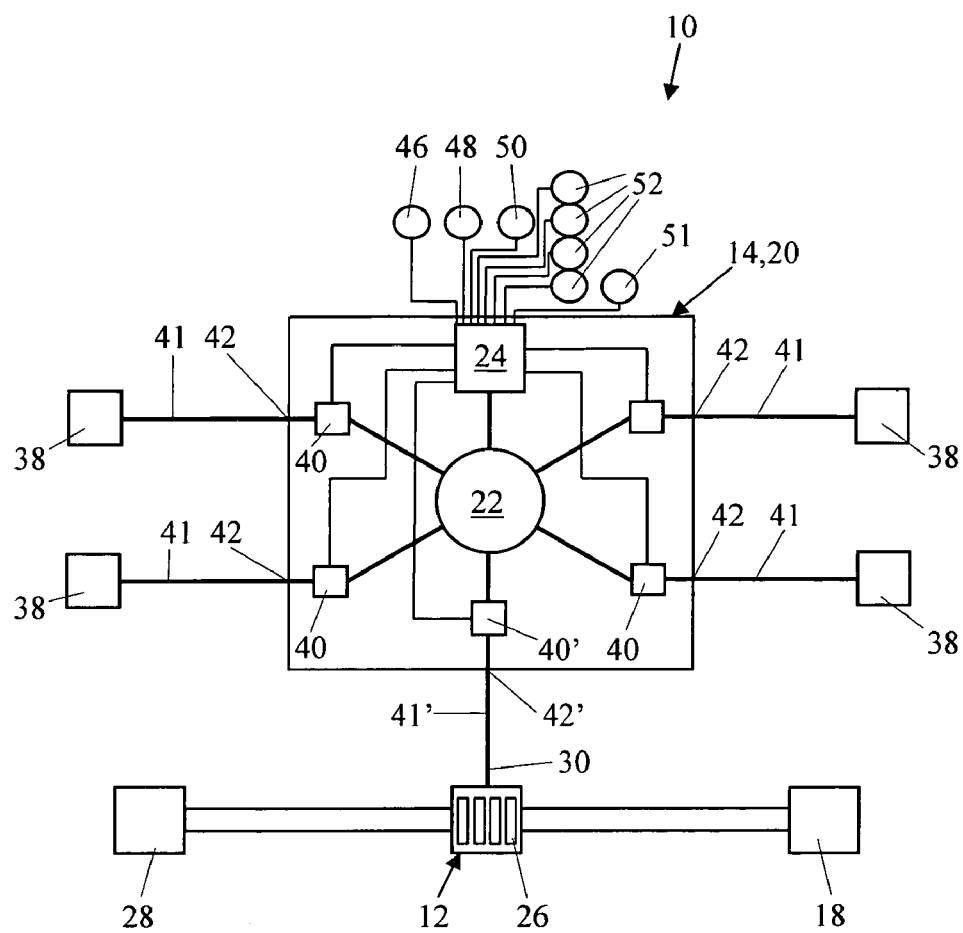
FIG. 2 is a schematic block diagram of the first embodiment of the all wheel drive coupling apparatus shown in FIG. 1 in which a brake system controller of the apparatus controls the operation of a clutch pack of the apparatus and in which the brake system provides hydraulic power.

A first embodiment of a vehicle drive apparatus is shown at 10 in FIGS. 1 and 2. Alternative embodiments of the drive apparatus 10 are generally shown at 10a, 10b, and 10c in the Figures. Reference numerals with the suffix "a" in FIG. 3, the suffix "b" in FIGS. 4–6, and the suffix "c" in FIG. 7 designate alternative configurations of elements common to the first embodiment of FIGS. 1 and 2. Unless the description indicates otherwise, where the description uses a reference numeral to refer to an element in FIG. 1 or 2, that portion of the description is intended to apply equally to corresponding elements in FIGS. 3–7 that are indicated by the same reference numeral, only with the suffix "a", "b", or "c". Also, unless the description indicates otherwise, where the description uses a reference numeral to refer to an element in FIG. 4 or 5, that portion of the description is intended to apply equally to elements in FIG. 7 indicated by the same reference numeral, but with the suffix "c."

The first embodiment of the vehicle drive apparatus 10 includes a hydraulically-actuated all-wheel-drive coupling 12 that divides torque between primary and secondary drive axles 16, 18 of a motor vehicle. The all-wheel-drive coupling 12 includes a hydraulically-actuated clutch pack 26 that transfers to a secondary drive axle 18 of the motor vehicle a portion of torque produced by an engine 27 and engine transmission 28.

As best shown in FIG. 2, the vehicle drive apparatus 10 also includes a hydraulically-actuated wheel brake system 14. The wheel brake system 14 shares a source of hydraulic pressure with the all-wheel-drive coupling 12 by sharing the output of its brake system hydraulic pump 22 with the all-wheel-drive coupling 12.

As is also best shown in FIG. 2, the wheel brake system 14 includes a modulator 20 that includes a brake system hydraulic pump 22 and a brake system controller 24. The clutch pack 26 of the all-wheel-drive coupling 12 connects to and receives hydraulic pressure from a brake system hydraulic pump 22. In other words, the brake system hydraulic pump 22 is in fluid communication with the clutch pack 26 and provides hydraulic power to the clutch pack 26. The fluid communication is provided through a hydraulic channel 30 that extends between the brake system hydraulic pump 22 and the clutch pack 26.

The brake system 14 may be any one of a number of different braking systems that are known in the art and that include a brake system hydraulic pump 22 providing "self-apply" braking capability. Examples of suitable systems include anti-lock brake systems, traction control systems, stability control systems, and electro-hydraulic "brake-by-wire" systems.

As shown in the Figures, the brake system hydraulic pump 22 may be included in a hydraulic modulator 20 of the brake system 14. As shown in FIG. 1, the brake system hydraulic modulator 20 is connected in a hydraulic circuit with a brake master cylinder 36 and vehicle wheel brakes 38. As best shown in FIG. 2, the brake system hydraulic modulator 20 includes the brake system hydraulic pump 22, five solenoid valve sets 40, 40', one valve set for each of five hydraulic circuits 41, 41'. The modulator 20 also includes the brake system controller 24. Four of the solenoid valve sets 40 are connected in the hydraulic circuits 41' that the brake system hydraulic pump 22 and each of four wheel brakes 38 are connected in to control the flow of pressurized hydraulic fluid from the hydraulic pump 22 to the wheel brakes 38. A fifth one of the solenoid valve sets 40' is connected in the hydraulic circuit 41' that the brake system hydraulic pump 22 and the all-wheel-drive clutch pack 26 are connected in. The brake system controller 24 is connected to all five solenoid valve sets 40, 40' and is programmed to control the operation of the solenoid valve sets 40, 40' in response to inputs from vehicle sensors 46, 48, 50, 52. Each of the five hydraulic circuits 41, 41' has an "apply" source and a dump source as is described in detail with regard to the 3rd embodiment of FIG. 4, below.

The brake system controller 24 is connected to the clutch pack 26 in the sense that it is connected to the fifth solenoid valve set 40' that controls hydraulic actuation of the all-wheel-drive clutch pack 26. As such, the brake system controller 24 is programmed to electronically control the operation of the clutch pack 26 through the fifth solenoid valve set 40'.

As is best shown in FIG. 2, the brake system modulator 20 includes connections 42 that provide fluid communication for the four wheel brake hydraulic circuits 41 with respective wheel brakes 38 of the vehicle and includes a fifth connection 42' that provides fluid communication for the fifth hydraulic circuit 41' with the clutch pack 26. As shown in FIG. 2, the brake system controller 24 is connected to the brake system hydraulic pump 22 and is programmed to control operation of the hydraulic pump 22 in such a way as to insure that hydraulic pressure is available when needed to actuate the wheel brakes 38 and/or the all-wheel-drive clutch pack 26.

The brake system controller 24 is programmed to control hydraulic actuation of the wheel brakes 38 and the clutch pack 26 in response to one or more of the steering angle, yaw rate, lateral acceleration, throttle position and wheel speed inputs from a steering angle sensor 46, a yaw rate sensor 48, a lateral acceleration sensor 50, a throttle position sensor 51, and four wheel speed sensors 52, respectively.

In other embodiments, the wheel brake system 14 may be an anti-lock brake system. The brake system hydraulic pump 22 in this case would be an anti-lock brake system pump and the brake system controller 24 would be an anti-lock brake system controller.

In still other embodiments, the wheel brake system 14 may be associated with a traction control system in which the brake system pump 22 is a traction control system pump and the brake system controller 24 is a traction control system controller.

In other embodiments, the wheel brake system 14 may be associated with a stability control system, the brake system pump 22 being a stability control system pump and the brake system controller 24 being a stability control system controller.

The wheel brake system 14 may also be an electro hydraulic "brake-by-wire" system. In such a system, the brake system pump 22 is an electro hydraulic brake system pump and the brake system controller 24 is an electro hydraulic brake system controller.

Figure 3:
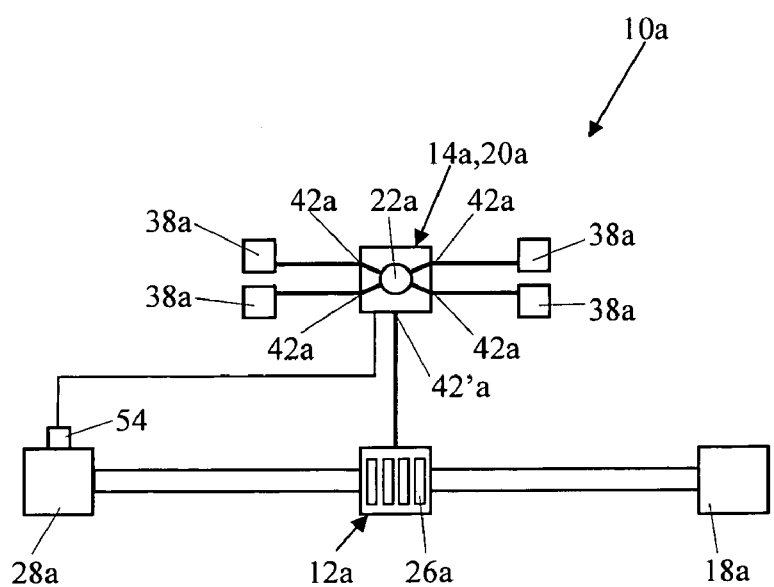
FIG. 3 is a schematic block diagram of a second embodiment of the all wheel drive coupling apparatus in which a transmission controller controls the operation of the clutch pack and in which the brake system provides hydraulic power.

As shown in FIG. 3, according to the second embodiment of the vehicle drive apparatus 10*a*, a transmission controller 54, rather than a brake system controller, may be connected to the clutch pack 26*a* and programmed to operate the clutch pack 26*a*. In fact, the clutch pack 26*a* may be connected to and electronically controlled by any suitable controller. Such a controller may, as shown in FIG. 3, be connected to the all-wheel-drive clutch pack 26*a* by connecting the controller to the brake system modulator 20*a*, which is in hydraulic communication with the clutch pack 26*a*.

Figure 4:
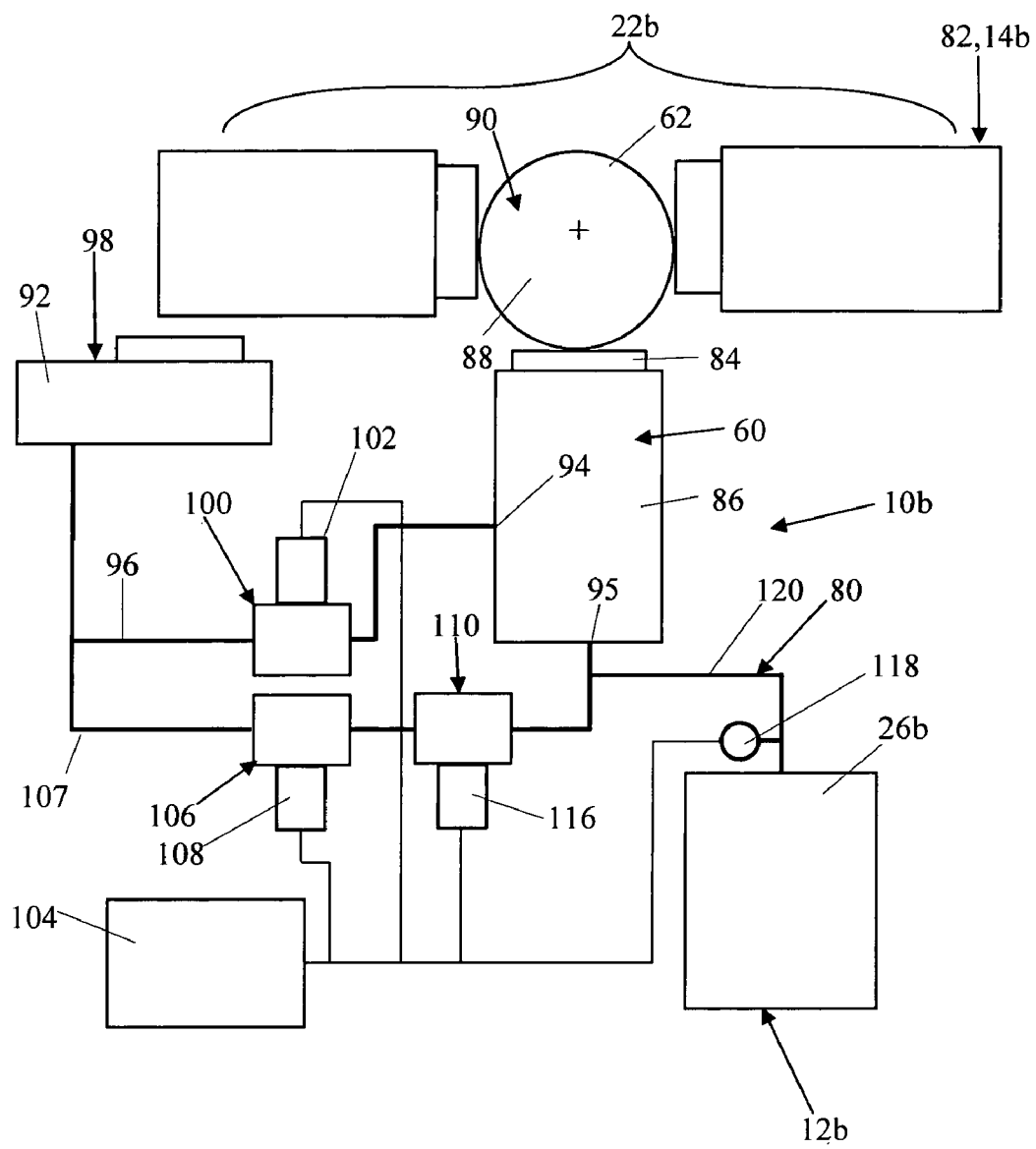
FIG. 4 is a schematic block diagram of a third embodiment of the vehicle drive apparatus in which the apparatus includes a dedicated hydraulic system separate from that of a wheel brake system but including an all-wheel-drive hydraulic pump driven by a motor that also drives the brake system hydraulic pump.
Figure 5:
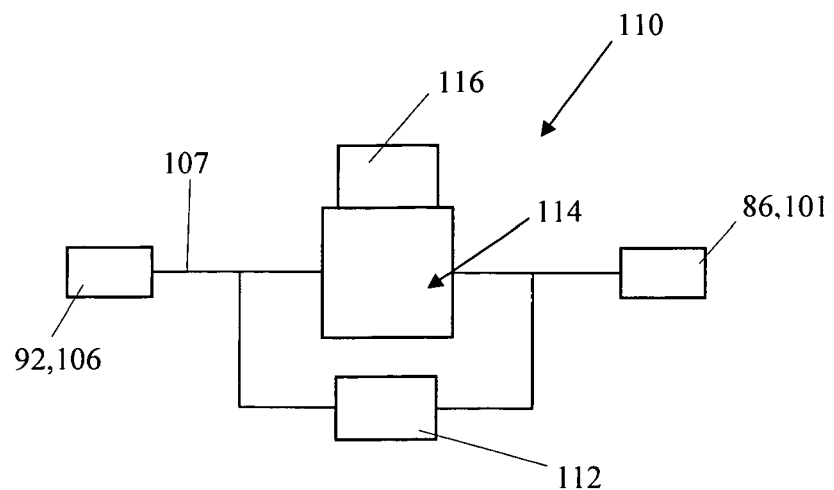
FIG. 5 is a schematic block diagram of a switchable orifice valve of the vehicle drive apparatus of FIG. 4.
Figure 6:
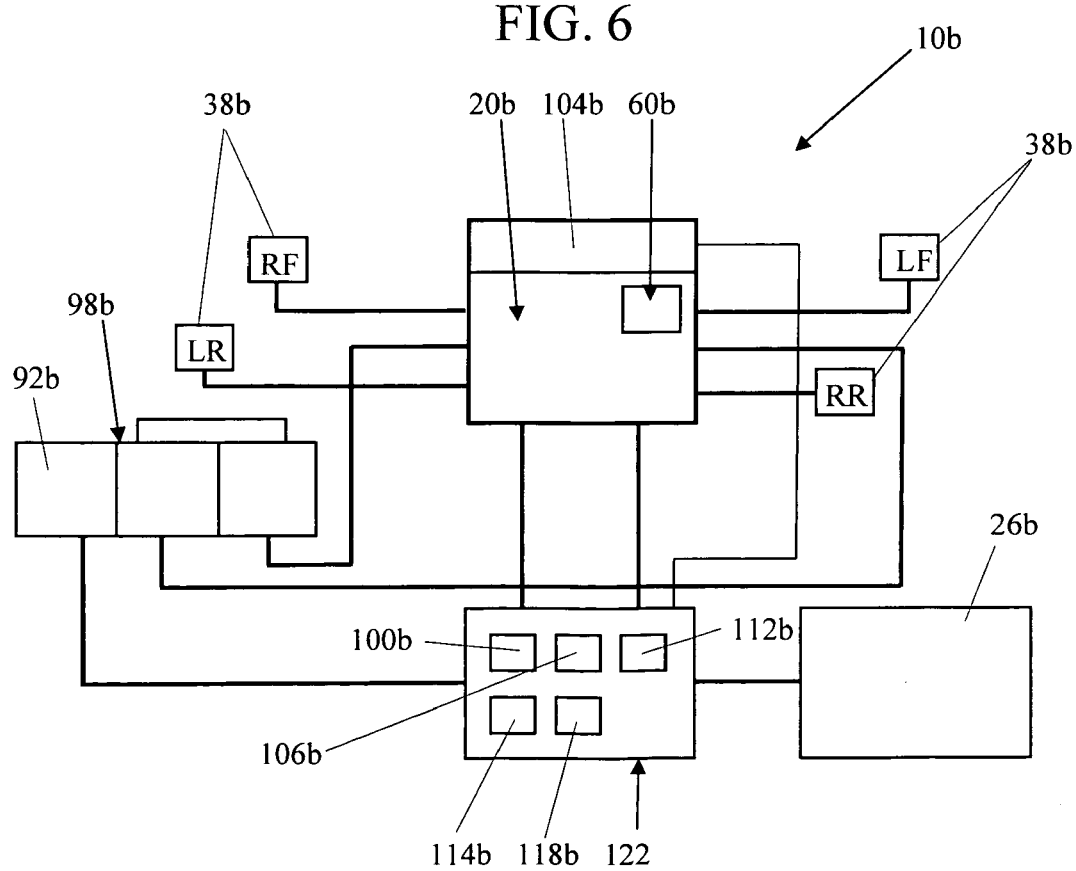
FIG. 6 is a schematic block diagram of the third embodiment of the vehicle drive apparatus of FIG. 4 showing a modular architecture that includes a dedicated AWD controller.

According to the third embodiment of the vehicle drive apparatus 10*b* shown in FIGS. 4–6, the apparatus 10*b* includes a dedicated hydraulic system 80 that is separate from a hydraulic system 82 of a wheel brake system 14*b*. As is best shown in FIG. 4, the dedicated hydraulic system 80 includes an all-wheel-drive hydraulic pump 60 designed to be mounted in a position to be driven by a pump motor 62 of a brake system hydraulic pump 22*b*. Because the respective hydraulic systems 80, 82 of the vehicle drive apparatus 10*b* and the wheel brake system 14*b* are isolated from one another, a hydraulic failure in the all-wheel-drive system will not affect operation of the wheel brake system 14*b*.

The all-wheel-drive hydraulic pump 60 includes a plunger 84 supported for reciprocal axial motion in a pump casing 86 such that reciprocal plunger motion draws hydraulic fluid into a pump inlet 94 of the pump casing 86 and pushes hydraulic fluid out an all-wheel-drive hydraulic pump outlet 95 disposed in the pump casing 86. The plunger 84 is drivable through at least a portion of its reciprocal motion by an eccentric cam 88 carried by a pump motor shaft 90 of a brake system hydraulic pump 22*b*.

The all-wheel-drive hydraulic system 80 includes an all-wheel-drive hydraulic fluid reservoir 92 that is in fluid communication with an inlet 94 of the all-wheel-drive hydraulic pump 60 through a first hydraulic fluid path 96. The first hydraulic fluid path 96 may be defined by any one of a number of suitable hydraulic fluid lines or passages known in the art. The all-wheel-drive hydraulic fluid reservoir 92 is carried as a separate third compartment of a brake system master cylinder reservoir 98. Because the all-wheel-drive and brake hydraulic system reservoirs 92, 98 are co-located, they can be evacuated and filled during vehicle assembly at the same assembly line station.

A priming valve 100 is connected in the first hydraulic fluid path 96 between the all-wheel-drive hydraulic fluid reservoir 92 and the all-wheel-drive hydraulic pump inlet 94. The priming valve 100 is powered between open and closed positions by a priming valve solenoid 102 and is operable to control the supply of hydraulic fluid to the all-wheel-drive hydraulic pump 60.

The priming valve 100 is normally closed and the priming valve solenoid 102 must be energized to drive the priming valve 100 to its open position. Accordingly, only the all-wheel-drive hydraulic system 80 would be disabled should control of the priming valve 100 be lost. The pump motor 62 would continue operating the brake system hydraulic pump 22*b* so that the brake system would continue to function. If, instead, the priming valve 100 were normally open, and if control of the priming valve 100 were lost, the controller would be unable to prevent the all-wheel-drive hydraulic pump 60 from pressurizing the all-wheel-drive hydraulic system 80 whenever the brake system pump motor 62 would be turning. The priming valve solenoid 102 is operably connected to the priming valve 100 and drives the priming valve 100 between open and closed positions. The priming valve solenoid 102 is coupled to a controller 104, and the controller 104 is programmed to control the supply of hydraulic fluid to the all-wheel-drive hydraulic pump 60 by controlling the position of the priming valve 100 through electronic control of the priming valve solenoid 102. The controller 104 may be a brake system controller, a dedicated all-wheel-drive system controller, or any other suitable controller capable of being programmed to provide desired control responses.

A dump valve 106 is connected in a second hydraulic fluid path 107 that may be defined, as is the first hydraulic fluid path 96, by any suitable hydraulic line or passage known in the art. The dump valve 106 is connected between the all-wheel-drive clutch pack 26*b* and the all-wheel-drive hydraulic fluid reservoir 92 and is operable to control the return of hydraulic fluid from the clutch pack 26*b* to the all-wheel-drive hydraulic fluid reservoir 92. A dump valve solenoid 108 is operably connected to the dump valve 106 and drives the dump valve 106 between open and closed positions. The dump valve solenoid 108 is coupled to the controller 104, and the controller 104 is programmed to control the return of hydraulic fluid from the clutch pack 26*b* by controlling the position of the dump valve 106 through electronic control of the dump valve solenoid 108. The dump valve 106 is normally open and the dump valve solenoid 108 must be energized to move the dump valve 106 from its open position to its closed position. Accordingly, even if control over dump valve 106 operation is lost, the all-wheel-drive hydraulic system 80 will not be pressurized.

A switchable orifice valve 110 is connected between the all-wheel-drive pump outlet 95 and the dump valve 106. As best shown in FIG. 5, the switchable orifice valve 110 includes a flow restricting orifice 112 connected in the second hydraulic fluid path 107 between the clutch pack 26b and the dump valve 106. The presence of the flow restricting orifice 112 improves control resolution by restricting volumetric flow. The orifice 112 allows for smaller pressure steps given a fixed minimum opening time of the dump valve 106. The size of the orifice 112 selected depends on the degree of pressure resolution desired.

As is also best shown in FIG. 5, the switchable orifice valve 110 also includes a normally closed orifice bypass valve 114 connected in parallel with the orifice 112 between the clutch pack 26b and the dump valve 106. The orifice bypass valve 114 is operable in response to control inputs to provide high volumetric flow allowing rapid pressure release. More specifically, the switchable orifice valve 110 includes a bypass valve solenoid 116 that is connected to the controller 104 and that, in response to control signals, drives the orifice bypass valve 114 between open and closed positions. As the orifice bypass valve 114 is normally open, the bypass valve solenoid 116 must be energized to drive the bypass valve 114 to its closed position. The parallel combination of the orifice 112 and the bypass valve 114 allows for rapid changes in volumetric flow to provide both fine control through the orifice 112, alone, when pressure is being modulated in the all-wheel-drive hydraulic system 80 to control the clutch pack and quick release of hydraulic pressure through both the orifice 112 and the bypass valve 114 when torque needs to be released quickly.

The controller 104 is programmed to modulate pressure applied to the clutch pack during application of torque by coordinating pump motor speed and the position of the dump valve 106. The controller 104 is also programmed to modulate hydraulic pressure applied to the clutch pack 26b during the release of torque by operating the dump valve 106, the degree of torque transfer being directly related to the magnitude of hydraulic pressure applied to the clutch pack 26b. The controller 104 is further programmed to modulate hydraulic pressure applied to the clutch pack 26b during the release of torque by operating the dump valve 106 and the orifice bypass valve 114.

A pressure sensor 118 is connected in a third hydraulic fluid path 120 that, like the first and second hydraulic fluid paths 96, 107, may be defined by any suitable hydraulic line or passage known in the art. The pressure sensor 118 is connected in line between the all-wheel-drive pump outlet 95 and the clutch pack 26b and is coupled to the controller 104. The pressure sensor 118 sends signals to the controller 104 that represent the magnitude of hydraulic pressure in the third hydraulic fluid path 120. The controller 104 is programmed to use the signals from the pressure sensor 118 as a feedback value in controlling the magnitude of hydraulic pressure applied to the clutch pack 26b.

As shown in FIG. 6, the apparatus 10b includes a modular architecture in which one or more of the priming valve 100b, the dump valve 106b, the orifice 112b, the orifice bypass valve 114b, and the pressure sensor 118b are included in a separate all-wheel-drive control assembly 122. The all-wheel-drive hydraulic pump 60b is included in a brake hydraulic modulator 20b. This embodiment is suitable for applications where the ability of a wheel brake system to accommodate these functions is limited or in applications where, for example, it is not desirable for the brake systems of all vehicles produced on a given vehicle platform to incorporate all these functions.

Figure 7:
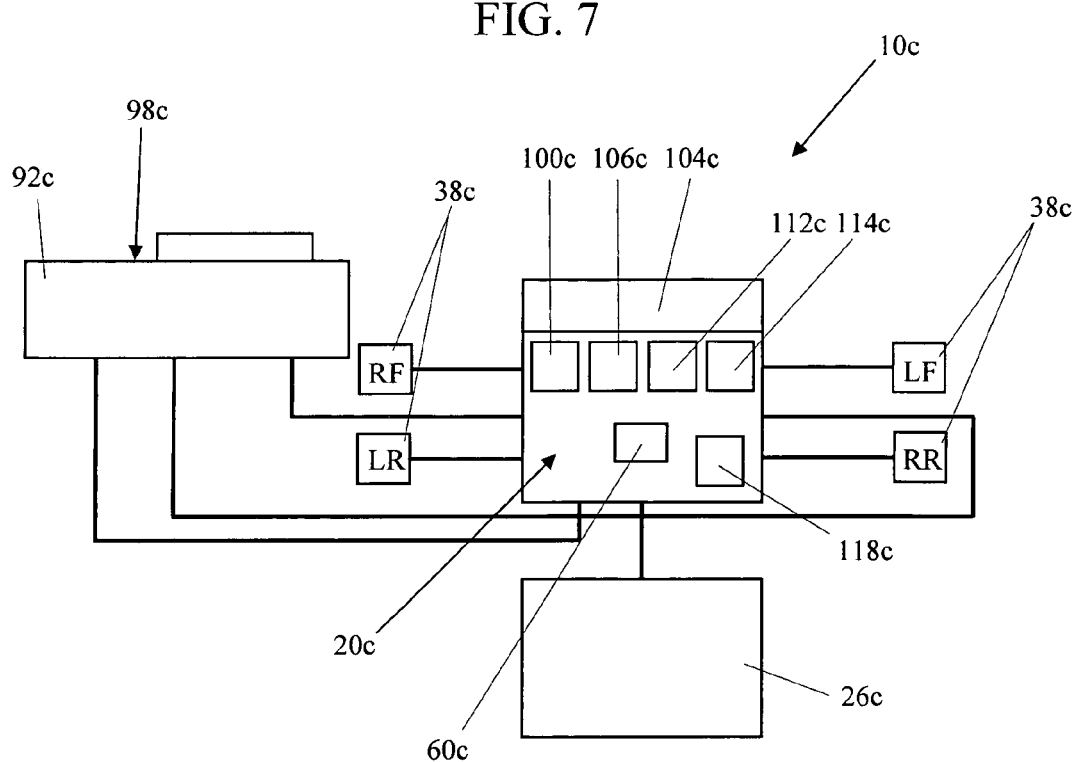
FIG. 7 is a schematic block diagram of a fourth embodiment of the vehicle drive apparatus identical to the third embodiment shown in FIGS. 4 and 5 except that it has an integrated architecture in which a brake system controller controls the operation of a clutch pack of the apparatus.

According the 4th embodiment shown in FIG. 7, the apparatus 10c includes an integrated architecture in which one or more of the priming valve 100c, the dump valve 106c, the orifice 112c, the orifice bypass valve 114c, and the pressure sensor 118c are included in the brake system hydraulic modulator 20c along with the all-wheel-drive hydraulic pump 60c. This embodiment reduces cost in applications where, for example, all the vehicles constructed on a given vehicle platform will use a brake system modulator that includes these items.

This description is intended to illustrate certain embodiments of the invention rather than to limit the invention. Therefore, it uses descriptive rather than limiting words. Obviously, it's possible to modify this invention from what the description teaches. Within the scope of the claims, one may practice the invention other than as described.

What is claimed is:

1. A vehicle drive apparatus (10) for dividing torque between primary and secondary drive axles (16, 18) of a motor vehicle, the apparatus comprising:
   a hydraulically actuated clutch pack (26) configured to transfer torque to a secondary drive axle (18) of an automotive vehicle;
   a hydraulic pressure source (22); and
   a hydraulic channel (30) extending and providing hydraulic fluid communication between the source of hydraulic pressure and the clutch pack, the source of hydraulic pressure being shared with a hydraulically-actuated wheel braking system (14).

2. A vehicle drive apparatus (10a) as defined in claim 1 in which the clutch pack (26a) is configured to connect to and be electronically controlled by a transmission controller (54).

3. A vehicle drive apparatus (10) as defined in claim 1 in which the clutch pack (26) is configured to connect to and be electronically controlled by a brake system controller (24).

4. A vehicle drive apparatus (10) as defined in claim 1 in which the clutch pack (26) is configured to transfer torque from an engine transmission (28) to a secondary drive axle (18) in an automotive all-wheel drive system.

5. A vehicle drive apparatus (10) as defined in claim 1 in which the clutch pack (26) is configured to connect to and receive hydraulic pressure from a brake system hydraulic pump (22).

6. A vehicle drive apparatus (10) that includes:
   an all-wheel-drive coupling (12) including a hydraulically actuated clutch pack (26) configured to transfer torque to a secondary drive axle (18) of an automotive vehicle; and
   a wheel brake system (14) including a brake system hydraulic pump (22) and a brake system controller (24), the brake system hydraulic pump (22) being in fluid communication with the all-wheel-drive clutch pack (26) and providing hydraulic power to the all-wheel-drive clutch pack (26).

7. A vehicle drive apparatus (10) as defined in claim 6 in which the brake system hydraulic pump (22) is included in a brake system modulator (20) that is configured to control hydraulic actuation of the all-wheel-drive clutch pack (26).

8. A vehicle drive apparatus (10) as defined in claim 7 in which the brake system modulator (20) includes connections (42) that provide fluid communication with wheel brakes (38) of the vehicle and an additional connection (42') that provides fluid communication with the all-wheel-drive clutch pack (26).

9. A vehicle drive apparatus (10) as defined in claim 7 in which the brake system modulator (20) includes a brake controller (24) connected to the brake system hydraulic pump (22) and programmed to control hydraulic actuation of the all-wheel-drive clutch pack (26).

10. A vehicle drive apparatus (10) as defined in claim 9 in which the brake controller (24) is programmed to control hydraulic actuation of the all-wheel-drive clutch pack (26) in response to one or more inputs selected from the group of inputs comprising steering angle, yaw rate, lateral acceleration, throttle position, and wheel speed inputs from vehicle sensors (46, 48, 50, 51, 52).

* * * * *